United States Patent [19]
Castel et al.

[11] Patent Number: 5,493,949
[45] Date of Patent: Feb. 27, 1996

[54] PNEUMATIC UPHILL ANTI-RUNBACK DEVICE

[75] Inventors: Philippe Castel, Paris; Pierre Pressaco, La Courneuve; Roland Levrai, Stains, all of France

[73] Assignee: Bendix Europe Services Techniques, Drancy, France

[21] Appl. No.: 90,056

[22] PCT Filed: Jun. 30, 1993

[86] PCT No.: PCT/FR93/00655

§ 371 Date: Jul. 23, 1993

§ 102(e) Date: Jul. 23, 1993

[87] PCT Pub. No.: WO94/02339

PCT Pub. Date: Feb. 3, 1994

[30] Foreign Application Priority Data

Jul. 22, 1992 [FR] France ..................... 92 09024

[51] Int. Cl.⁶ .................................................. F15B 9/10
[52] U.S. Cl. ........................................ 91/376 R; 60/547.1
[58] Field of Search .......................... 91/369.1, 369.2, 91/376 R, 374; 92/96; 60/547.1, 547.2

[56] References Cited

U.S. PATENT DOCUMENTS

| | | |
|---|---|---|
| 2,030,288 | 2/1936 | Freeman . |
| 2,251,787 | 8/1941 | Gardiner . |
| 4,576,004 | 3/1986 | Bach .................................. 91/376 R X |
| 4,893,691 | 1/1990 | Park ....................................... 180/169 |
| 5,117,738 | 6/1992 | Horner .............................. 91/376 R X |
| 5,400,693 | 3/1995 | Schluter ................................. 91/376 R |

FOREIGN PATENT DOCUMENTS 0221299  5/1987  European Pat. Off. .

*Primary Examiner*—Edward K. Look
*Assistant Examiner*—Hoang Nguyen
*Attorney, Agent, or Firm*—Leo H. McCormick, Jr.; Larry J. Palguta

[57] ABSTRACT

This device, which is intended for vehicles equipped with a brake system comprising a pneumatic brake booster (1) and a master cylinder (2), enables the braked vehicle to be held back on an upslope. It comprises an inclinometric valve (12) which under certain conditions prevents the booster (1) from returning to its position of rest.

2 Claims, 2 Drawing Sheets

PNEUMATIC UPHILL ANTI-RUNBACK DEVICE

The present invention relates to a braking device for motor vehicles, which in particular is equipped with a brake pedal and a pneumatic brake-booster, the latter in turn comprising:

first and second chambers sealingly separated by a movable wall and connected, permanently in the case of the first and selectively by operation of the pedal in the case of the second, to respective first and second pressure sources delivering pressures the difference between which is not zero, the operation of the pedal enabling brake-boosting work to occur as the result of a displacement of the movable wall through the action of said pressure difference;

first pedal-controlled valve means for establishing selective communication between the two chambers, this communication being interrupted from the commencement of each operation of the pedal and being restored only at the end of its release;

second pedal-controlled valve means for establishing selective communication between the second chamber and the second pressure source, this communication being established in the course of each operation of the pedal and interrupted on the commencement of its release, and third valve means connected in series with the first valve means and adapted to establish additional selective communication between the chambers.

Devices of this kind are for example known from the documents EP-A-0 171 585, EP-A-0 173 054 and EP-A-0 201 689, which are incorporated by reference in the present description.

Despite their interest, these devices of the prior art necessarily make use of a solenoid valve to constitute the third valve means, the relatively high cost of which valve considerably restricts its field of application.

The present invention has in particular the object of overcoming this difficulty and does so by providing a device in which the third valve means comprise an inclinometric valve reacting to the inclination of the vehicle to prevent, at least in a determined direction and at a determined amplitude of inclination of the vehicle, communication between the two chambers.

This device, generally intended for a motor vehicle equipped with a clutch mechanism, may then advantageously comprise in addition control means reacting to a movement of said clutch mechanism to bring about the opening of the third valve means in response to said movement.

Although the utilization of clutch pedal-controlled inclinometric valves for holding back a vehicle on a downslope is known, for example from the patents U.S. Pat. Nos. 2,030,288 and 2,251,787, which are in turn incorporated herein by reference, these valves have hitherto been used only on the hydraulic brake circuit, with the disadvantage of having to resist high pressures, of having to be provided in duplicate for dual brake circuits, and of making the ending of the braking of the vehicle very highly and abruptly sensitive to the release of the clutch pedal, all of these disadvantages being also eliminated by the present invention.

In particular, the slight pressure difference existing on the two sides of a pneumatic device (a maximum of a few bars and usually less than one bar), in comparison with a hydraulic device, and also the use of a single circuit instead of a dual circuit therefore give rise to greatly reduced sensitivity, and therefore disturbance, at the clutch pedal.

In addition, the device provided can be used in a very simple manner, without additional external piping.

Other features and advantages of the invention will emerge clearly from the description thereof given below, by way of indication and without limitation, with reference to the accompanying drawings, in which.

Figure 1:
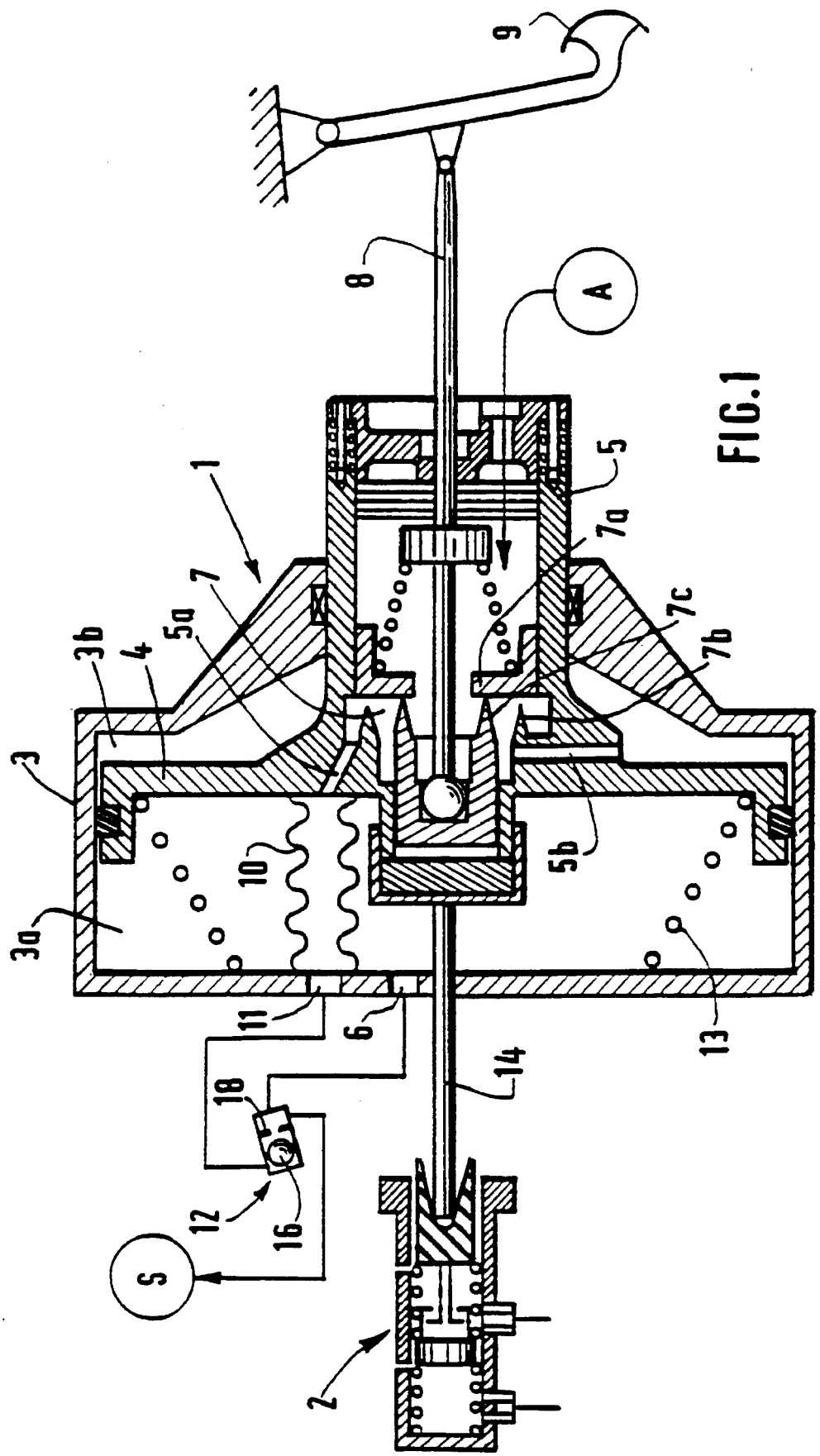
FIG. 1 is a schematic view in section of a brake system utilizing the invention.

Inasmuch as the invention relates only to an improvement made to pneumatic brake-booster systems and as the general constitution and the functioning of the latter are well known to those versed in the art, these systems will be rapidly recalled here solely to permit full understanding of the improvement provided by the invention.

Schematically, a system of this type comprises a booster 1 and a master cylinder 2.

The booster itself comprises a rigid casing 3 sealingly divided into two chambers 3a and 3b by a wall 4 fastened to a pneumatic piston 5 movable inside the casing.

The front chamber 3a, the front face of which is in reality sealingly closed by the master cylinder 2, is permanently connected to a vacuum source S (not shown) by way of a first opening 6 in the casing 3.

The pressure in the rear chamber 3b is controlled by a valve 7 operated by an operating rod 8 connected to the brake pedal 9.

The valve 7 comprises in fact an annular seal 7a capable of cooperating with a first annular seat 7b fastened to the piston and with a second annular seat 7c fastened to the operating rod 8.

When the latter is in the position of rest, in this case pulled towards the right, the valve constituted by the seal 7a and the seat 7b is open and normally establishes communication between the chambers 3a and 3b of the booster by way of a passage 5a in the piston and of a bellows 10 connecting said passage to a second opening 11 in the casing 3, said opening 11 being in turn connected to the first opening 6 by way of a pneumatic inclinometric valve 12 which is specific to the invention and which for the moment will be assumed to be open.

Since the rear chamber 3b is then subjected to the same vacuum as the front chamber 3a, the piston 5 is pushed towards the right, into the position of rest, by a spring 13.

The actuation of the operating rod towards the left (braking) first has the effect of isolating the chambers 3a and 3b from one another through the application of the seal 7a against the first seat 7b, and then of opening the rear chamber 3b to the atmospheric pressure A, by way of a passage 5b, through the opening of the second valve, that is to say through the separation of the seal 7a and the second seat 7c.

The pressure difference between the two chambers, which then acts on the wall 4, exerts on the piston 5 a brake-boosting force which is superimposed on the force exerted by the pedal. The resulting load moves said piston towards the left, compressing the spring 13 and driving a push rod 14 actuating the master cylinder 2.

The release of the pedal 9 first brings about the closing of the second valve 7a, 7c, the rear chamber 3b being from that moment isolated from the atmosphere, and then the opening of the first valve 7a, 7b.

Since the inclinometric valve 12 is connected in series with the first valve 7a, 7b, the opening of said first valve enables the front chamber 3a and rear chamber 3b to be in communication with one another only if the inclinometric valve 12 is open.

Consequently, if the valve 12 is open, the rear chamber 3b is in communication with the vacuum source S and the wall 4 is brought back to the position of rest, on the right, by the spring 13.

On the other hand, if the valve 12 is closed, the pressure difference between the front and rear chambers is maintained and the brake assistance force exerted by the booster continues to be applied to the master cylinder 2 by means of the push rod 14.

Figure 3:
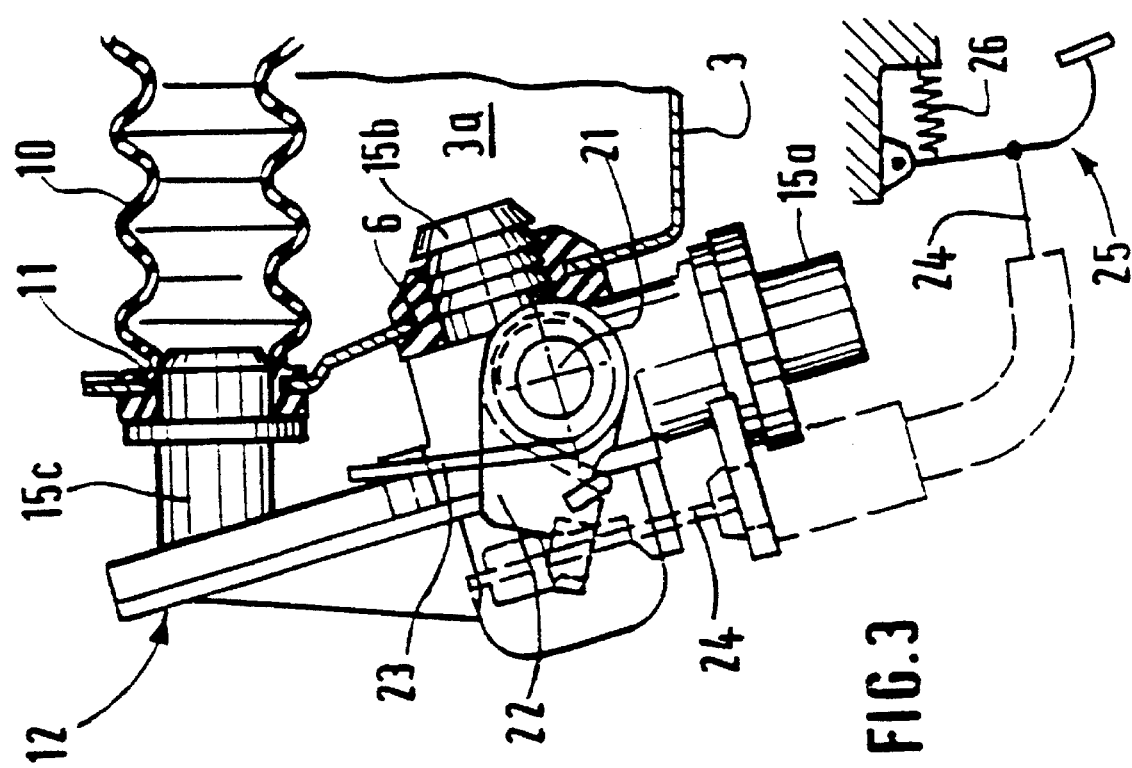
FIG. 3 is a partial view in section of a pneumatic booster, showing in side view the valve illustrated in FIG. 2.
Figure 2:
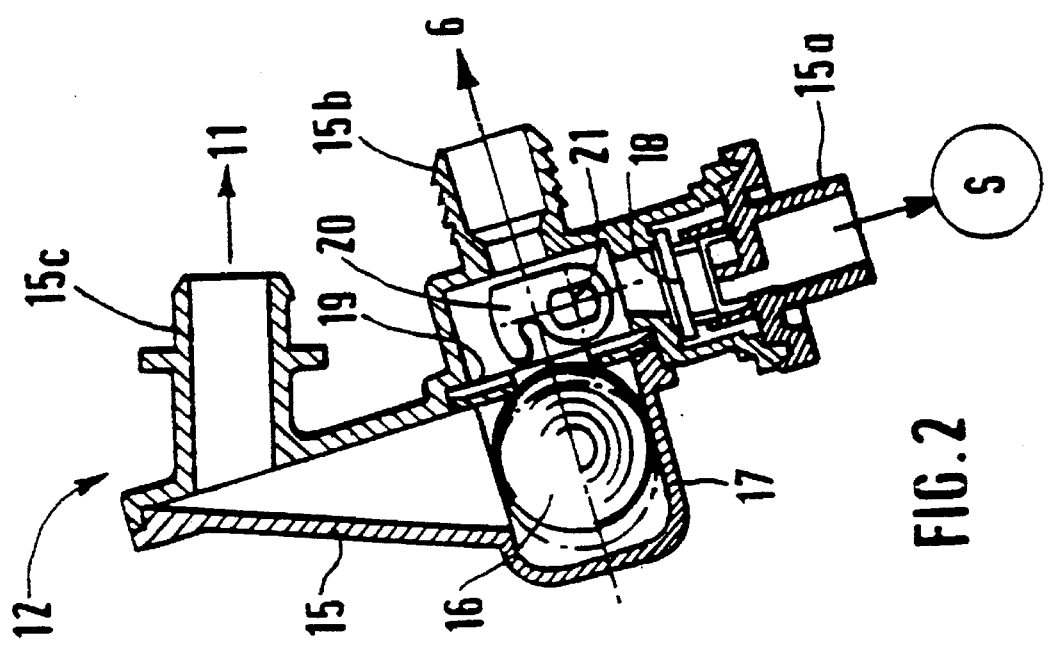
FIG. 2 is a view in section of an inclinometric valve utilizable in a device according to the invention.

The inclinometric valve 12, which is shown in detail in FIGS. 2 and 3, comprises a leaktight body 15 enclosing a ball 16 constrained to roll on a plane 17 slightly inclined towards the front of the vehicle when the latter is horizontal, and inclined towards the rear when the vehicle climbs uphill.

The body 15 is shaped so as to exhibit three branch passages 15a, 15b and 15c enabling it to be connected respectively to the vacuum source S and to the first and second openings 6 and 11 of the rigid casing 3.

A nonreturn valve 18 is disposed between the passages 15b and 15a to allow air to pass only from the first 15b of these passages to the second 15a, and an annular valve seat 19 is disposed between the passages 15b and 15c.

On an upslope the ball 16 is applied by gravity against the seat 19, which it closes, thus interrupting the communication which in other circumstances is established between the passages 15b and 15c.

A lever 20 mounted rotatably inside the body 15 by means of a pin 21 is capable of passing through the central space of the seat 19 to push the ball 16 back away from the latter and thus to restore communication between the passages 15b and 15c.

As shown in FIG. 2, the pin 21 is fastened for rotation with an external lever 22 capable of being pulled, against a return force exerted by a spring 23, by a cable 24 connected to the clutch pedal 25, which in turn is urged towards its position of rest by a powerful spring 26.

As long as the clutch pedal is not depressed, the lever 20 passes through the seat 19 and prevents the ball 16 from interrupting communication between the passages 15b and 15c.

On the other hand, if the vehicle is stopped on an upslope and the clutch pedal is depressed, the ball 16 is applied against the seat 19 sufficiently to interrupt this communication and the vehicle is then braked, even after the brake has been released, as long as the clutch pedal 25 is not released.

As those versed in the art will understand, the cable 24 could be replaced by any functional equivalent, for example an electric push-button operated by the movement of the clutch pedal or the movement of any other clutch mechanism.

The movement of the ball 16 is advantageously damped, at the end opposite the seat 19, by any appropriate means in order to avoid noise.

A position detector, for example an electric contact or a Hall effect sensor, can be used to detect the position of one of the movable members associated with the operation of the valve 12 and to enable an indicator lamp to light up to signal the operation of said valve.

Finally, although the valve 12 has been described as being fastened to the rigid casing 3, it could still serve its essential purpose if situated elsewhere, for example on the movable wall 4, provided that its inclination remains dependent on that of the vehicle.

We claim:

1. A braking device for a motor vehicle which is equipped with a brake pedal and a pneumatic brake-booster, the brake-booster comprising:

first and second chambers separated sealingly by a movable wall and connected, permanently for the first chamber and selectively by operation of the pedal for the second chamber, to respective first and second pressure sources delivering different pressures, the operation of the pedal enabling brake-boosting to occur as the result of a displacement of the movable wall by means of the pressure difference;

first pedal-controlled valve means for establishing selective communication between the two chambers, the communication being interrupted from the commencement of each operation of the pedal and being restored only at the end of release of the pedal;

second pedal-controlled valve means for establishing selective communication between the second chamber and the second pressure source, the communication with the second source being established for each operation of the pedal and interrupted on commencement of release of the pedal, and third valve means connected in series with the first valve means and adapted to establish additional selective communication between the chambers, characterized in that the third valve means comprises an inclinometric valve reacting to the inclination of the vehicle to prevent, at least in a determined direction and at a determined amplitude of inclination of the vehicle, communication between the two chambers.

2. The braking device according to claim 1 and for a motor vehicle equipped with a clutch mechanism, characterized in that in addition the device comprises control means reacting to a movement of said mechanism to bring about the opening of the third valve means in response to said movement.

\* \* \* \* \*